United States Patent [19]

Chuang et al.

[11] Patent Number: 5,551,012

[45] Date of Patent: Aug. 27, 1996

[54] SINGLE SOCKET UPGRADEABLE COMPUTER MOTHERBOARD WITH AUTOMATIC DETECTION AND SOCKET RECONFIGURATION FOR INSERTED CPU CHIP

[75] Inventors: Te-Chih Chuang, Miao-Lee City; Yunn-Hung Liao, Taipei; Lung Wei, Taichung; Yi-Hsien Lee, Taipei, all of Taiwan

[73] Assignee: Acer Incorporated, Industrial Park, Taiwan

[21] Appl. No.: 208,056

[22] Filed: Mar. 8, 1994

Related U.S. Application Data

[63] Continuation of Ser. No. 872,611, Apr. 22, 1992, abandoned, which is a continuation-in-part of Ser. No. 689,317, Apr. 22, 1991, abandoned.

[51] Int. Cl.⁶ .................................................. G06F 15/76
[52] U.S. Cl. ............................................................ 395/500
[58] Field of Search ............................................... 395/500

[56] References Cited

U.S. PATENT DOCUMENTS

| | | | |
|---|---|---|---|
| Re. 31,318 | 7/1983 | Kaufman et al. | 395/400 |
| 3,721,961 | 3/1973 | Edstrom et al. . | |
| 4,075,693 | 2/1978 | Fox et al. . | |
| 4,281,392 | 7/1981 | Grants et al. | 395/425 |
| 4,319,343 | 3/1982 | Powell | 365/189 |
| 4,443,846 | 4/1984 | Adcock . | |
| 4,484,273 | 11/1984 | Stiffler et al. . | |
| 4,674,089 | 6/1987 | Poret et al. | 371/25 |
| 4,716,526 | 12/1987 | Mori et al. . | |
| 4,860,252 | 8/1989 | Sykora | 395/400 |
| 4,862,355 | 8/1989 | Newman et al. . | |
| 4,899,306 | 2/1990 | Greer | 395/500 |
| 4,908,789 | 3/1990 | Blokkum et al. | 395/425 |
| 4,951,248 | 8/1990 | Lynch | 395/425 |
| 4,964,074 | 10/1990 | Suzuki et al. . | |
| 4,975,838 | 12/1990 | Mizuno et al. | 364/200 |
| 5,093,908 | 3/1992 | Beacom et al. | 395/375 |
| 5,101,342 | 3/1992 | Namimoto | 395/800 |
| 5,121,486 | 6/1992 | Kurihara et al. | 395/325 |
| 5,138,708 | 8/1992 | Vosbury | 395/575 |
| 5,202,976 | 4/1993 | Hansen et al. | 395/500 |
| 5,287,460 | 2/1994 | Olsen et al. | 395/275 |
| 5,297,272 | 3/1994 | Lu et al. . | |
| 5,325,490 | 6/1994 | Brasseur | 395/325 |

FOREIGN PATENT DOCUMENTS

| | | |
|---|---|---|
| 0333318 | 9/1989 | European Pat. Off. . |
| 0381448 | 8/1990 | European Pat. Off. . |
| 0411806 | 2/1991 | European Pat. Off. . |
| 61-84764 | 4/1986 | Japan . |
| 61-84765 | 4/1986 | Japan . |
| 61-84767 | 4/1986 | Japan . |

OTHER PUBLICATIONS

"Motherboard Convertibility," *Byte*, Jun. 1991 pp. 68.
IBM Technical Disclosure Bulletin, IBM Corp., Sep. 1989, vol. 32, No. 4A, p. 467.
Judy Wong, Modular CPU Upgrade Comparison of Acer, ALR and AST, Jun. 13, 1991, pp. 1 through 2.

*Primary Examiner*—Richard L. Ellis
*Attorney, Agent, or Firm*—Townsend and Townsend and Crew LLP

[57] ABSTRACT

An upgradeable/downgradeable computer system is made capable of being driven by more than one model of central processing units, including at least one socket means capable of being plugged with different model of central processing units, an identifying circuit capable of identifying the model of the central processing unit in the socket means and generating an identifying signal, a clock generator responsive to the identifying signal for generating a clock signal acceptable to the model of the central processing unit in the socket means, and a means responsive to the identifying signal for gating and inhibiting a plurality of input/output signals of the central processing unit in the socket means.

28 Claims, 3 Drawing Sheets

SINGLE SOCKET UPGRADEABLE COMPUTER MOTHERBOARD WITH AUTOMATIC DETECTION AND SOCKET RECONFIGURATION FOR INSERTED CPU CHIP

CROSS-REFERENCE TO RELATED APPLICATIONS

This is a Continuation of application of U.S. Ser. No.07/872,611, filed Apr. 22, 1992, now abandoned which is a Continuation-in-part of U.S. Ser. No. 07/689,317, filed Apr. 22, 1991, now abandoned.

BACKGROUND OF THE INVENTION

1. Field of Invention

The present invention relates generally to an upgradeable/downgradeable computer, and specifically to a computer having circuits capable of being driven by more than one model of central processing unit (CPU).

2. Description of the Related Art

As prices of CPUs decrease, the cost of a CPU as portion of the total cost of the whole system decreases, and as introduction of new types of central processors is becoming faster and faster (for example, within a span of only a few years, the Intel Corporation has introduced models 8086, 80286, 80386, 80486), it is now feasible to have a computer system that can be upgraded or downgraded by simply replacing processors. More specifically, it is desirable to have a computer system with circuitry (motherboard) that can accept different types of central processors without alteration.

FIG. 1 is a block diagram of a prior art system. As shown in FIG. 1, the system 10 is designed with two distinct sockets, the first socket 1' for 80486SX (80P23), and the second socket 2' for 80487SX (80P23N). In addition to the CPU clock signal (CLK) from the clock source 7', all other signals from/to data bus 100', address bus 101', and control bus 102' of the 80486SX, are tied to the corresponding signals of the 80487SX. The MP# signal of the 80487SX is tied high to allow the system 10 to function normally when the 80487SX is not present. When the 80487SX is inserted in the first socket 1', the MP# signal of the 80487SX drives the BOFF# signal and the FLUSH# signal of the 80486SX active, thus, tri-stating it. The 80487SX then takes charge of the buses 100', 101' and 102' and the system 10 works normally.

SUMMARY OF THE INVENTION

The present invention relates to an upgradeable/downgradeable computer system capable of being driven by more than one model of processor. The computer system comprises a circuit board which has a socket for receiving a processor, means for identifying the model of the processor in the socket and generating an identifying signal, clock generator responsive to the identifying signal for generating a clock signal acceptable to the identified processor, and circuits responsive to the identifying signal for gating and inhibiting a plurality of input/output signals of the identifyed processor.

DETAILED DESCRIPTION OF THE PREFERRED EMBODIMENTS

The present invention is described, by way of example, with reference to models 80486SX, 80486DX, and 80487SX of Intel Corporation's central processors. These different models of processors operate on different frequencies and have the following pin assignments:

TABLE 1

| Pin No.  | A13   | A15   | B14 | B15 | C14   |
|----------|-------|-------|-----|-----|-------|
| 80486SX  | NC    | NMI   | NC  | NC  | NC    |
| 80486DX  | NC    | IGNNE# | NC  | NMI | FERR# |
| 80487SX  | FERR# | IGNNE# | MP# | NMI | NC    |

"NC" means that the corresponding pin of a processor is not connected.

There are two differences between pinouts of 80487SX and 80486DX. In 80487SX, the FERR# signal (which carries an output signal indicating occurrence of a floating point error) is assigned to pin A13. In contrast, the FERR# signal is assigned to pin C14 in the 80486DX. In addition, 80487SX has a output signal (MP#) on pin B14, but pin B14 of the 80486DX is not used. The MP# signal is activated low and is never floated. It is driven low at power up and remains active for the entire duration of the processor's operation.

Figure 1:
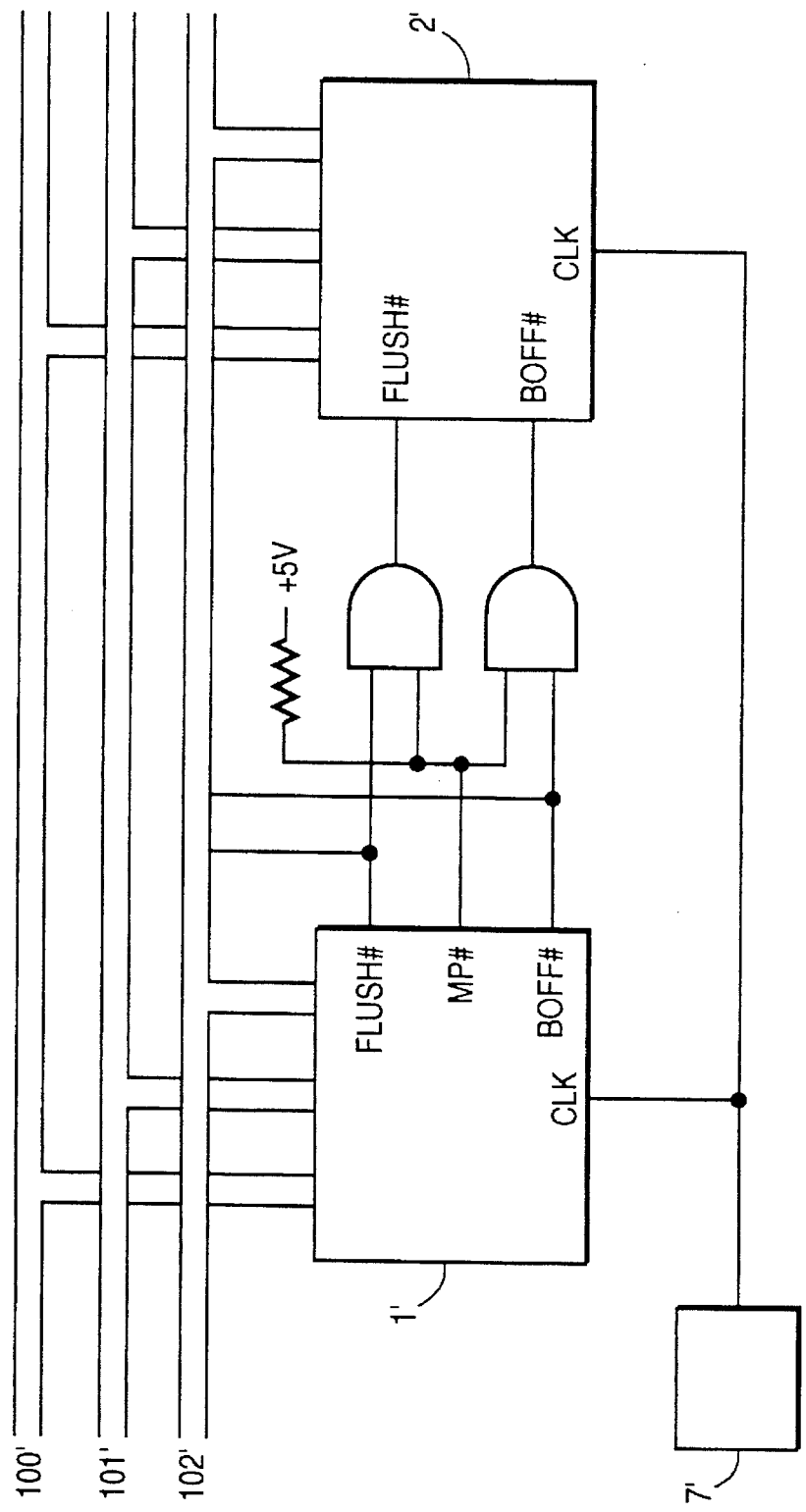
FIG. 1 is a block diagram of a prior art circuit.
Figure 2:
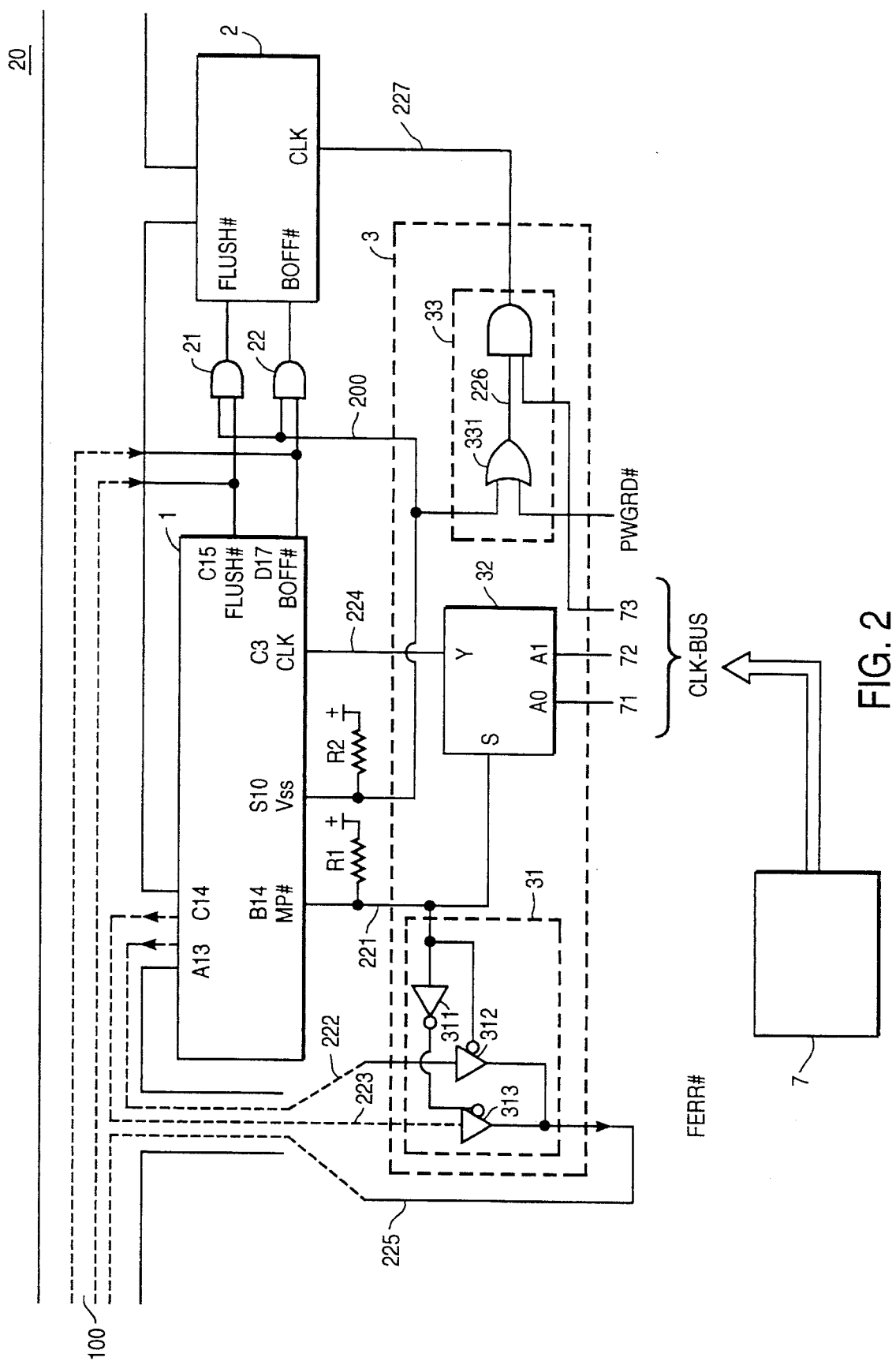
FIG. 2 is a logic block diagram illustrating a computer system wherein the present invention is embodied.

FIG. 2 is a block diagram of a computer system 20 wherein the present invention is embodied. The computer system 20 comprises a first socket 1 for receiving a first processor and a second socket 2 for receiving a second processor. The first socket 1 and the second socket 2 are each connected to a bus 100 through which address, data and control signals are passed. Not shown in FIG. 2 are memory, input/output devices and other components of the system. These components are not shown because they are generally known to those skilled in the art.

According to a preferred embodiment of the present invention, the first socket 1 is capable of receiving either the 80486DX or the 80487SX processor models. The first socket 1 is connected to a circuit 3 which, as will be described herein below, is capable of identifying the model of processor plugged into the socket 1 as well as generating clock frequency appropriate for the model plugged in.

Pin B14 of the first socket 1, which is used to output the MP# signal if a 80487SX model is plugged in, or is open when a 80486DX is plugged in, is tied to a "high" voltage signal through a resister R1.

Upon entering the circuit 3, the MP# signal 221 will be used to drive a selector 32. The selector 32 has two inputs, A0 and A1. A0 receives a clock signal 71 from the clock source 7, whose frequency is appropriate for operation of 80486DX. A1 receives a clock signal 72 from the clock source 7, whose frequency is appropriate for the operation of 80487SX. Depending on the logic signal level of the selection control pin S, which is controlled by the output of the MP# signal 221, one of these clock signals will be input to the first socket 1 at clock pin C3. When a 80486DX is plugged in, the logic signal level of the selection control pin S will be high because pin B14 is open. When a 80487SX is plugged in, the logic signal level of the selection control pin S will be low because of the MP# signal at pin B14.

The signal (either the MP# signal or a high voltage) from pin B14 of the first socket 1 is also used to control two tri-state gates 312 and 313. The input of tristate gate 312 is coupled to pin A13 of socket 1 for passing the FERR# signal when the 80487SX processor is inserted into socket 1. The input of the other tristate 313 is coupled to pin C14 of socket 1 for passing the FERR# signal when the 80486DX processor is inserted into socket 1. Thus, each of these two gates 312, 313 receives the FERR# signal from the first socket 1 when the appropriate processor is inserted into tile socket 1. However, because of the inverter 311, only one gate 312, 313 will pass the FERR# signal at any instant. When a 80486DX is plugged in, gate 313 will be enabled and tile FERR# signal at pin C14 of the first socket 1 will be gated to the bus 100 by line 225. When a 80487SX is plugged in, gate 312 will be enabled and the FERR# signal at pin A13 of the first socket 1 will be gated to the bus 100.

To further improve flexibility of the computer system 20, a second socket 2 is provided for the connection of a 80486SX processor. In the event that both the first socket 1 and the second socket 2 house processors, the processor in the second socket 2 will be disabled. This is accomplished by the signal 200 coming out of the "Vss" pin S10 of the first socket 1. This "Vss" pin S10 is tied to a logic "high" voltage signal through a resister R2. It will be understood by those skilled in the art that while this improved circuit can accept two processors, they do not need to be plugged in concurrently for the computer system to operate.

When a processor is plugged into the first socket 1, the signal 200 from the "Vss" pin S10 will disable signals (e.g. BOFF# and FLUSH#) to tile second socket 2 by AND gates 21 and 22. The method of disabling a processor in a two-processor system using a signal from the non-disabled processor is known to the art.

Advantageously, the signal 200 from the "Vss" pin S10 is also used to disable clock signal 73 from clock source 7 into the first socket 1 so as to reduce power spent by the disabled processor. To allow the processor in the second socket 2 to stabilize, circuit 33 is used. Circuit 33 basically ORs the signal 200 with a "power good" (PWGRD#) signal of the computer system 20. The output signal 226 of OR gate 331 is then used to control the clock signal 73 to the second socket 2. The PWGRD# signal would become active only for a few cycles immediately after power on. The effect is to have the PWGRD# signal enable the clock signal 73 to pass to the processor in the second socket 2 to allow it to stabilize.

Figure 3:
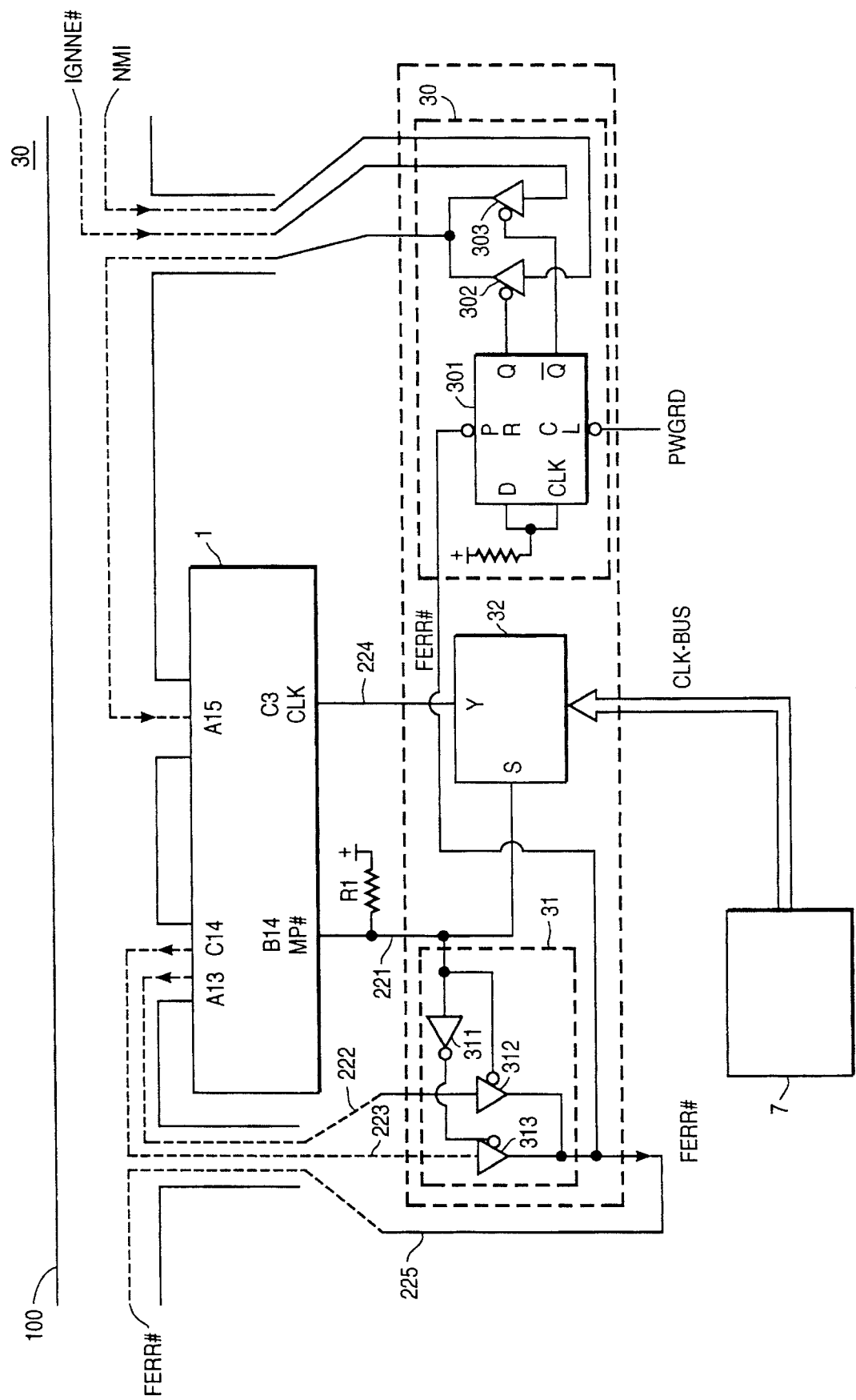
FIG. 3 is a logic block diagram illustrating an alternate embodiment of the computer system of the present invention.

Referring now to the logic diagram of FIG. 3, an alternate embodiment for the upgradeable/downgradeable computer system is illustrated. The upgradeable/downgradeable computer system preferably has a CPU socket cable of housing different models of central processing units, such as the 80486SX, 80487SX, and 80486DX.

As shown in Table 1, pin A13 of 80487SX is assigned to FERR# signal, but pin C14 of 80486DX is for the FERR# signal; pin A15 of 80486SX is for NMI, but pin A15 of 80486DX or 80487SX is for IGNNE# signal. Therefore, the problem of pin assignment such as that of A13 or C14 (which connects to bus 100, handling the floating point error signal FERR# 225), or A15 (which connects to bus 100, handling the ignore error signal IGNNE# or non-maskable interrupt request NMI) must be resolved before CPU socket 1 is capable of holding different models of processors like 80486SX, 80486DX and 80487SX.

The basic function of the control circuit 30 is to control the IGNNE# or NMI signals of bus 100 which connects to pin A15 of CPU socket 1. Circuit 30 comprises a D type flip-flop 301 and two gates 302, 303.

The data input D and the clock input (CLK) of flip-flop 301 are tied to a high voltage through a pull up resistor. The output Q of said flip-flop 301 is used to control gate 302, and the inverted output Q' is used to control gate 303. The clear input CL of said flip-flop 301 is connected to a power good signal (PWGRD) which shows the stability of the power supply. The preset input (PR) is connected to the FERR# signal on line 225. Generally, the present invention employs 80486SX in CPU socket 1 as processor if not otherwise specified. The system 30 can be upgraded by replacing the 80486SX with either a 80487SX or 80486DX in CPU socket 1.

When a 80486SX is plugged in CPU socket 1, since pin B14 of 80486SX is "NC", the signal 221 is coupled to a high voltage through a resistor R1, and will turn off gate 312, and also turns on gate 313. As a result, the signal at pin C14 of CPU socket 1 is then gated to bus 100. Since pin C14 of the 80486SX is "NC" because the 486SX does not comprise an internal coprocessor, neither a high logic level nor a low level voltage will be outputted on line 225 as the FERR# signal and the FERR# signal will not affect the normal operation of the system 30 in this case.

As mentioned above, when CPU socket 1 is occupied by 80486SX, pin C14 is "NC" and connected to FERR# 225, and since FERR# 225 is connected to the preset input PR of the D type flip-flop 301, the output (Q or Q') of the flip-flop 301 will remain unchanged. It means that when 80486SX is used in default, the NMI signal sent through tristate gate 302 and input to pin A15 of tile CPU socket 1.

Moreover, when a 80486SX is plugged in CPU socket 1 and PWGRD signal is sent to the clear input CL of the flip-flop 301, since tile data input D of the flip-flop 301 and the clock input CLK are tied "high", the voltage of the output Q of the flip-flop 301 is low ("0") and the voltage of the inverted output Q' of the flip-flop 301 is high ("1"). If the voltage of the output Q of the flip-flop 301 is low, gate 302 will be turned on allowing the NMI signal to be sent to pin A15 of CPU socket 1, while the gate 303 will be turned off disconnecting the IGNNE# from pin A15 of CPU socket 1.

However, if a 80486DX or 80487SX is plugged in CPU socket 1, pill A15 of CPU socket 1 must be connected to the IGNNE# signal of bus 100, and disconnected from the NMI signal of bus 100.

To accomplish this, the present invention executes a segment of a program to test the existence of coprocessor before initiating POST (Power On Self Test) of the BIOS (Basic Input/Output System). If a coprocessor exists, the program will then intentionally generate a computing error for the coprocessor, such as executing three basic coprocessor instructions FLD1, FLDZ and FDIV to perform a division by zero. Therefore, a low voltage ("0") for FERR# signal will be outputted from pin A13 or pin C14 of the CPU socket 1 to the preset input (PR) of the flip-flop 301.

When the logic low level of FERR# signal is sent to the preset input of flip-flop 301, the output Q of the flip-flop 301 will be present to high ("1"). Therefore, gate 302 is turned off to disconnect the NMI signal pin A15 of CPU socket 1. Meanwhile, the inverted output Q' of the flip-flop 301 will be low ("0"), and gate 303 will be turned on, allowing IGNEE# signal to be connected to pin A15 of CPU socket 1. Therefore, a socket means 1 capable of receiving different models of central processors such as 80486SX, 80487SX and 80486DX can be accomplished.

While the invention has been described with respect to preferred embodiments thereof, it is to be understood that the foregoing and other modifications and variations may be made without departing from the scope and spirit thereof.

What is claimed is:

1. An upgradeable/downgradeable central processing unit (CPU) chip computer system for driving by more than one type of CPU chip, said computer system including a circuit board, the circuit board comprising:

a first socket, disposed on the circuit board, for receiving different types of CPU chips, wherein at least first and second of said different types of CPU chips drive a particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator, coupled to said identifying circuit and to said first socket, responsive to said identification signal for generating clock signals compatible with the type of CPU chip in said first socket; and an enabling circuit, disposed on the circuit board and coupled to said identifying circuit and to said first socket, responsive to said identifying signal for (a) enabling signals on said first output pin to be transmitted when a CPU chip of said first type is in said first socket and (b) enabling signals on said second output pin to be transmitted when a CPU chip of said second type is in said first socket, thereby allowing said particular output signal to be transmitted regardless of which one of said first and second types of CPU chip is in said first socket;

wherein said clock signal generator is disposed on the circuit board.

2. The computer system of claim 1 wherein said identifying circuit comprises means for detecting a logic state of at least one signal output from the CPU chip in said first socket.

3. The computer system of claim 1, wherein said first socket includes engagement portions for said first and second output pins and said enabling circuit comprises:

an inverter having an input and an output, said input coupled to said identifying circuit;

a first tri-state gate having an input and an output and an enabling terminal, said input coupled to said engagement portion for said first output pin, said enabling terminal coupled to said identifying circuit, and said output coupled to said bus; and a second tri-state gate having an input and an output and an enabling terminal, said input coupled to said engagement portion for said second output pin, said enabling terminal coupled to said output of said inverter, and said output coupled to said bus.

4. The computer system of claim 3 wherein said clock signal generator operates to generate a plurality of clock signals having frequencies compatible with the operation of the different types of CPU chips and further comprises a selector, coupled to said first socket and to said clock signal generator, for selecting a clock signal from said clock signal generator responsive to a logic state of at least one output signal from a CPU chip inserted in said first socket, said logic state identifying the type of CPU chip in said first socket, and thereafter determining the compatible clock signal for the CPU chip.

5. The computer system of claim 4 wherein:

said bus includes first and second particular input bus lines;

at least two of said different types of CPU chip receive different ones of said first and second particular input signals on the same particular input pin, depending on the type of CPU chip; and said first socket includes an engagement portion for said particular input pin, and further comprising:

gate means having inputs coupled to said first and second particular input bus lines and having an output coupled to said engagement portion for said particular input pin; and flip-flop means, coupled to said gate means, for controlling which of said first and second particular input bus lines is coupled to said engagement portion for said particular input pin.

6. The computer system of claim 1, further comprising a second socket disposed on the circuit board for receiving a second CPU chip, said second socket coupled to said bus, to said first socket, and to said identifying circuit.

7. The computer system of claim 6, further comprising means responsive to a signal from a CPU chip in said first socket for disabling a CPU chip in said second socket, said disabling means coupled to said bus, to said first socket, and to said identifying circuit.

8. An upgradeable/downgradeable central processing unit (CPU) chip computer system for receiving more than one type of CPU chip including a CPU chip having a coprocessor, said computer system including a circuit board, the circuit board comprising:

a bus for communicating address, data, and control signals, said bus including a particular output bus line for a particular output signal and first and second particular input bus lines for first and second particular input signals;

at least one socket means, disposed on the circuit board and coupled to said bus for receiving different types of CPU chips, wherein at least two of said different types of CPU chips drive said particular output signal on different first and second respective output pins, depending on the type of CPU chip, and wherein at least two of said different types of CPU chips receive different ones of said first and second particular input signals on the same particular input pin, depending on the type of CPU chip;

an identifying circuit, disposed on the circuit board and coupled to said socket means, for identifying the type of CPU chip inserted in said socket means and for generating an identification signal in response to the identification;

a clock signal generator, coupled to said identifying circuit and to said socket means, responsive to said identification signal for generating clock signals compatible with the type of CPU chip in said socket means; and an enabling circuit, disposed on the circuit board and coupled to said identifying circuit, to said socket means, and to said bus, responsive to said identification signal for (a) enabling signals on said first output pin to be transmitted to said particular output bus line when a CPU chip that is in said socket means is of a type that drives said particular output signal on said first output pin, (b) enabling signals on said second output pin to be transmitted to said particular output bus line when a CPU chip that is in said socket means is of a type that drives said particular output signal on said second output pin, (c) enabling signals on said first particular input bus line to be transmitted to said particular input pin when a CPU chip that is in said socket means is of a type that receives said first particular input signal on said particular input pin, and (d) enabling signals on said second particular input bus line to be transmitted to said particular input pin when a CPU chip that is in said socket means is of a type that receives said second particular input signal on said particular input pin, thereby allowing said particular output signal to be transmitted to said particular output bus line and the appropriate one of said particular first and second input signals to be transmitted to said particular input pin regardless of which type of CPU chip is in said socket means;

wherein said clock signal generator is disposed on the circuit board.

9. The computer system of claim 8 further comprising:

a stabilizing circuit, coupled to said first socket; and a second socket, disposed on the circuit board and coupled to said bus, to said first socket, and to said stabilizing circuit, for receiving a different type of CPU chip, said different type of chip having different pin assignments from the chip in the first socket.

10. The computer system of claim 8 wherein at least one of said different types of CPU chips includes a coprocessor.

11. The computer system of claim 8 wherein said more than one type of CPU chips includes:

a first type of CPU chip which contains no coprocessor, does not drive said particular output signal, and receives said first particular input signal on said particular input pin;

a second type of CPU chip which contains a coprocessor, drives said particular output signal on said first particular output pin, and receives said second particular input signal on said particular input pin;

a third type of CPU chip which contains a coprocessor, drives said particular output signal on said second particular output pin, and receives said second particular input signal on said particular input pin.

12. The computer system of claim 11 wherein said enabling circuit includes:

flip-flop means, responsive to a said particular output signal, for maintaining a first state in the absence of an assertion of said particular output signal and for maintaining a second state after an assertion of said particular output signal;

gate means, responsive to said first and second particular input signals and to the state of said flip-flop means, for communicating said first particular input signal to said particular input pin of a CPU chip in said socket means when said flip-flop means is in said first state and communicating said second particular input signal to said particular input pin of a CPU chip in said socket means when said flip-flop means is in said second state; and means for generating instructions, recognized by CPU chips of said second and third types but not by CPU chips of said first type, said instructions, when recognized, causing a CPU chip in said socket means to assert said particular output signal, whereupon said flip-flop means maintains said first state when a CPU chip of said first type is in said socket means and said flip-flop means enters and maintains said second state when a CPU chip of either said second or third types is in said socket means.

13. The computer system according to any of claims 6 or 9 wherein the first socket is adapted to receive a CPU chip selected from the group consisting of 80486DX and 80487SX microprocessor chips and the second socket is adapted to receive an 80486SX CPU chip.

14. An upgradeable/downgradeable central processing unit chip (CPU) computer system for driving by more than one type of CPU chip, said computer system including a circuit board, the circuit board comprising:

a bus for communicating address, data, and control signals, said bus including an output bus line for a particular output signal;

at least one socket means, disposed on the circuit board and coupled to said bus, for plugging in different types of CPU chips, wherein at least first and second of said different types of CPU chips drive said particular output signal on different first and second respective output pins, depending on the type of CPU chip;

said socket means having engagement portions for said first and second output pins;

an identifying circuit, disposed on the circuit board and coupled to said socket means, for identifying the type of CPU chip inserted in said socket means and for generating an identification signal in response to the identification;

a clock signal generator, coupled to said identifying circuit and to said socket means, for generating a clock signal, in response to said identification signal, compatible with the type of CPU chip inserted in said socket means;

a first signal path coupled to said engagement portion for said first output pin, and a second signal path coupled to said engagement portion for said second output pin; and a selector means, coupled to said signal paths and to said output bus line, for selecting one of said first and second signal paths for providing said particular output signal, said selection being responsive to the type of CPU chip in said socket means, thereby allowing said particular output signal to be transmitted to said output bus line, regardless of which one of said first and second types of CPU chips is in said socket means.

15. The computer system of claim 14 wherein said particular output signal is a floating point error signal (FERR).

16. An upgradeable/downgradeable central processing unit (CPU) chip computer system for driving by more than one type of CPU chip, said computer system including a circuit board, the circuit board comprising:

a bus for communicating address, data, and control signals, said bus including an output bus line for a floating point error signal (FERR), and first and second input bus lines for an ignore numeric error signal (IGNNE) and a non-maskable interrupt request signal (NMI);

at least one socket means, disposed on the circuit board and coupled to said bus, for plugging in different types of CPU chips, wherein at least two of said different types of CPU chips drive said FERR signal on different first and second respective output pins, and wherein at least two of said different types of CPU chips receive different ones of said IGNNE and NMI signals on the same particular input pin;

said socket means having engagement portions for said first and second output pins and for said particular input pin;

an identifying circuit, disposed on the circuit board and coupled to said socket means, for identifying the type of CPU chip inserted in said socket means and for generating an identification signal in response to the identification;

a clock signal generator, coupled to said identifying circuit and to said socket means, for generating a clock signal, in response to said identification signal, compatible with the type of CPU chip inserted in said socket means;

a first signal path coupled to said engagement portion for said first output pin, a second signal path coupled to said engagement portion for said second output pin, and a third signal path coupled to said engagement portion for said input pin; and a selector means, disposed on the circuit board and coupled to said output bus line and said first and second input bus lines and to said signal paths, for selecting one of said first and second signal paths for coupling with said output bus line for transmitting said FERR signal, and for selecting one of said first and second input bus lines for coupling with said third signal path for transmitting one of said IGNNE signal and said NMI signal to said input pin;

said selection being responsive to the type of CPU chip in said socket means, thereby allowing said FERR signal to be transmitted on said output bus line and the appropriate one of said IGNNE and NMI signals to be received on said input pin, regardless of which one of said at least two types of CPU chips is in said socket means.

17. The computer system of any of claims 1, 8, 14, or 16 wherein each of said first and second types of CPU chips is selected from the group consisting of 80486DX and 80487SX microprocessor chips.

18. The computer system of any of claims 14 or 16, wherein said clock signal generator is disposed on the circuit board.

19. An upgradeable/downgradeable central processing unit chip (CPU) computer system for driving by more than one type of CPU chip, said computer system including a circuit board, the circuit board comprising:

a bus for communicating address, data, and control signals, said bus including a particular output bus line for a particular output signal;

at least one socket means, disposed on the circuit board and coupled to said bus, for plugging in different types of CPU chips, wherein at least one of said different types of CPU chips drives said particular output signal on a first output pin;

said socket means having engagement portions for said first output pin;

an identifying circuit, disposed on the circuit board and coupled to said socket means, for identifying the type of CPU chip inserted in said socket means and for generating an identification signal in response to the identification;

a clock signal generator, coupled to said identifying circuit and to said socket means, for generating a clock signal, in response to said identification signal, compatible with the type of CPU chip inserted in said socket means;

a first signal path coupled to said engagement portion of said first output pin; and selector means, disposed on the circuit board and coupled to said signal path and to said output bus line, for selecting said first signal path for providing said particular output signal, said selection being responsive to the type of CPU chip in said socket means, thereby allowing said particular output signal to be transmitted to said output bus line when the CPU chip inserted in said socket means.

20. The computer system of claim 19 wherein at least one of said different types of CPU chips includes a coprocessor.

21. The computer system of claim 19 wherein said more than one type of CPU chips includes:

a first type of CPU chip which contains no coprocessor, does not drive said particular output signal;

a second type of CPU chip which contains a coprocessor, and drives said particular output signal;

a third type of CPU chip which contains a coprocessor, and drives said particular output signal.

22. The computer system of claim 21 wherein said first, second, and third types of chips are 486SX, 487SX, and 486DX CPU chips, respectively.

23. The computer system of claim 21 wherein said selector means includes:

flip-flop means, responsive to a said particular output signal, for maintaining a first state in the absence of an assertion of said particular output signal and for maintaining a second state after an assertion of said particular output signal;

means for generating instructions, recognized by CPU chips of said second and third types but not by CPU chips of said first type, said instructions, when recognized, causing a CPU chip in said socket means to assert said particular output signal, whereupon said flip-flop means maintains said first state when a CPU chip of said first type is in said socket means and said flip-flop means enters and maintains said second state when a CPU chip of either said second or third types is in said socket means.

24. An upgradeable/downgradeable central processing unit chip (CPU) computer system for driving by more than one type of CPU chip, said computer system including a circuit board, the circuit board comprising:

a bus for communicating address, data, and control signals, said bus including a particular output bus line for a particular output signal and first and second particular input bus lines for first and second particular input signals;

at least one socket means, disposed on the circuit board and coupled to said bus, for plugging in different types of CPU chips, wherein at least first and second of said different types of CPU chips drive said particular output signal on different first and second respective output pins, depending on the type of CPU chip;

said socket means having engagement portions for said first and second output pins;

an identifying circuit, disposed on the circuit board and coupled to said socket means, for identifying the type of CPU chip inserted in said socket means and for generating an identification signal in response to the identification;

a clock signal generator, coupled to said identifying circuit and to said socket means, for generating a clock signal; in response to said identification signal, compatible with the type of CPU chip inserted in said socket means;

a first signal path coupled to said engagement portion for said first output pin, and a second signal path coupled to said engagement portion for said second output pin; and selector means, disposed on the circuit board and coupled to said signal paths and to said output bus line, for selecting one of said first and second signal paths for providing said particular output signal, said selection being responsive to the type of CPU chip in said socket means, thereby allowing said particular output signal to be transmitted to said output bus line, regardless of which one of said first and second types of CPU chips is in said socket means.

25. The computer system of claim 24 wherein at least one of said different types of CPU chips includes a coprocessor.

26. The computer system of claim 24 wherein said more than one type of CPU chips includes:

a first type of CPU chip which contains no coprocessor, does not drive said particular output signal, and receives said first particular input signal on said particular input pin;

a second type of CPU chip which contains a coprocessor, drives said particular output signal on said first particular output pin, and receives said second particular input signal on said particular input pin;

a third type of CPU chip which contains a coprocessor, drives said particular output signal on said second particular output pin, and receives said second particular input signal on said particular input pin.

27. The computer system of claim 26 wherein said first, second, and third types of chips are 486SX, 487SX, and 486DX CPU chips, respectively.

28. The computer system of claim 24 wherein said selector means includes:

flip-flop means, responsive to a said particular output signal, for maintaining a first state in the absence of an assertion of said particular output signal and for maintaining a second state after an assertion of said particular output signal;

gate means, responsive to said first and second particular input signals and to the state of said flip-flop means, for communicating said first particular input signal to said particular input pin of a CPU chip in said socket means when said flip-flop means is in said first state and communicating said second particular input signal to said particular input pin of a CPU chip in said socket means when said flip-flop means is in said second state; and means for generating instructions, recognized by CPU chips of said second and third types but not by CPU chips of said first type, said instructions, when recognized, causing a CPU chip in said socket means to assert said particular output signal, whereupon said flip-flop means maintains said first state when a CPU chip of said first type is in said socket means and said flip-flop means enters and maintains said second state when a CPU chip of either said second or third types is in said socket means.

\* \* \* \* \*